United States Patent
Kawamura et al.

(10) Patent No.: US 12,168,741 B2
(45) Date of Patent: Dec. 17, 2024

(54) URETHANE PREPOLYMER, ADHESIVE, MULTILAYER BODY AND SYNTHETIC LEATHER

(71) Applicant: DAINICHISEIKA COLOR & CHEMICALS MFG. CO., LTD., Chuo-ku (JP)

(72) Inventors: Ryo Kawamura, Chuo-ku (JP); Toshiki Yamada, Chuo-ku (JP); Kazuya Sasaki, Chuo-ku (JP)

(73) Assignee: DAINICHISEIKA COLOR & CHEMICALS MFG. CO., LTD., Chuo-ku (JP)

(*) Notice: Subject to any disclaimer, the term of this patent is extended or adjusted under 35 U.S.C. 154(b) by 0 days.

(21) Appl. No.: 17/639,451

(22) PCT Filed: Aug. 24, 2020

(86) PCT No.: PCT/JP2020/031832
§ 371 (c)(1),
(2) Date: Mar. 1, 2022

(87) PCT Pub. No.: WO2021/044887
PCT Pub. Date: Mar. 11, 2021

(65) Prior Publication Data
US 2022/0325153 A1    Oct. 13, 2022

(30) Foreign Application Priority Data
Sep. 5, 2019 (JP) .................. 2019-162001

(51) Int. Cl.
*C09J 175/06* (2006.01)
*C08G 18/10* (2006.01)
(Continued)

(52) U.S. Cl.
CPC ............ *C09J 175/06* (2013.01); *C08G 18/10* (2013.01); *C08G 18/3206* (2013.01);
(Continued)

(58) Field of Classification Search
CPC ................ C08G 18/10; C08G 18/3206; C08G 18/4263; C08G 18/2825; C08G 18/2865; C08G 18/4238; C08G 18/7671
See application file for complete search history.

(56) References Cited

U.S. PATENT DOCUMENTS 6,087,463 A * 7/2000 Tada ...................... C08G 18/10
528/45
11,136,430 B2 * 10/2021 Kawamura ........ C08G 18/4216
(Continued)

FOREIGN PATENT DOCUMENTS

CN        1224746 A      8/1999
CN      101410473 A      4/2009
(Continued)

OTHER PUBLICATIONS

DE 19731392 A1, Jan. 1999, machine translation (Year: 1999).*
(Continued)

*Primary Examiner* — Satya B Sastri
(74) *Attorney, Agent, or Firm* — Oblon, McClelland, Maier & Neustadt, L.L.P.

(57) ABSTRACT

The present invention relates to a urethane prepolymer having an isocyanate group, a viscosity at 100° C. of 30 to 600 dPa·s, and a thermal softening temperature after moisture curing of 75 to 155° C.

20 Claims, 2 Drawing Sheets

(51) Int. Cl.
  *C08G 18/32*  (2006.01)
  *C08G 18/42*  (2006.01)
  *C09J 7/32*   (2018.01)
  *D06N 3/14*   (2006.01)

(52) U.S. Cl.
  CPC ............ *C08G 18/4263* (2013.01); *C09J 7/32* (2018.01); *D06N 3/14* (2013.01); *C09J 2467/006* (2013.01); *D06N 2211/28* (2013.01)

(56) References Cited

U.S. PATENT DOCUMENTS

| | | | | |
|---|---|---|---|---|
| 2007/0169887 A1* | 7/2007 | Kanagawa | ............ | D06N 3/0088 156/331.7 |
| 2009/0208759 A1* | 8/2009 | Kanagawa | ............ | C08G 18/44 428/423.1 |
| 2013/0274401 A1* | 10/2013 | Allen | ............ | C08G 18/089 528/85 |
| 2021/0087323 A1* | 3/2021 | Kawamura | ............ | C08G 18/724 |

FOREIGN PATENT DOCUMENTS

| | | | | |
|---|---|---|---|---|
| CN | 109749687 A | | 5/2019 | |
| CN | 109790271 A | | 5/2019 | |
| DE | 19731392 A1 * | | 1/1999 | ............ C08G 18/74 |
| JP | 3-86719 A | | 4/1991 | |
| JP | 5-140532 A | | 6/1993 | |
| JP | H05-140532 * | | 6/1993 | ............ C08G 18/00 |
| JP | 2000-336142 A | | 12/2000 | |
| JP | 2001-11419 A | | 1/2001 | |
| JP | 2002363240 A * | | 12/2002 | ............ B60J 1/00 |
| JP | 2003-231729 A | | 8/2003 | |
| JP | 2005-126595 A | | 5/2005 | |
| JP | 2007-45977 A | | 2/2007 | |
| JP | 2007-63510 A | | 3/2007 | |
| JP | 2014-208783 A | | 11/2014 | |
| JP | 2015-101699 A | | 6/2015 | |
| WO | WO-2019221090 A1 * | | 11/2019 | ............ C08G 18/12 |

OTHER PUBLICATIONS

Indian Office Action issued Apr. 27, 2022 in Indian Patent Application No. 202247011042, 6 pages.
Combined Chinese Office Action and Search Report issued May 24, 2022 in Patent Application No. 202080062087.9 (with English translation of Category of Cited Documents), received on Jul. 14, 2022, 7 pages.
Written Opinion issued on Oct. 27, 2020 in PCT/JP2020/031832 filed on Aug. 24, 2020 (with English translation).
International Search Report issued on Oct. 27, 2020 in PCT/JP2020/031832 filed on Aug. 24, 2020, 3 pages.
Japanese Office Action issued on May 11, 2020 in Japanese Patent Application No. 2019-162001, 3 pages.
Japanese Notice of Allowance issued on Jul. 27, 2020 in Japanese Patent Application No. 2019-162001, 3 pages.
Foreign Office Action issued Jul. 11, 2023, in Chinese Patent Application No. 202080062087.9, 7 pgs.
Foreign Office Action was issued in Chinese Patent Application No. 202080062087.9 on Mar. 29, 2023.

* cited by examiner

URETHANE PREPOLYMER, ADHESIVE, MULTILAYER BODY AND SYNTHETIC LEATHER

CROSS-REFERENCE TO RELATED APPLICATIONS

The present application is the national stage of international application PCT/JP2020/031832, filed on Aug. 24, 2020, and claims the benefit of the filing date of Japanese Appl. No. 2019-162001, filed on Sep. 5, 2019.

TECHNICAL FIELD

The present invention relates to urethane prepolymers, adhesives, and synthetic leather.

BACKGROUND ART

A moisture-curable adhesive is a polyurethane having an isocyanate group at a terminal thereof, and reacts with moisture (humidity) in the air to cause a crosslinking reaction, thereby exhibiting a function as an adhesive. In general, a polyurethane-based adhesive uses a technique called a two-pack curing system, in which a polyfunctional isocyanate is blended with a polyurethane having a hydroxy group at a terminal and crosslinking is performed. On the other hand, the above moisture-curable adhesive has an advantage in that it can be coated without blending. However, in general, the softening temperature after crosslinking is as high as 170 to 200° C. due to an increase in molecular weight caused by crosslinking, and thus the durability is sufficient, but there is no adhesiveness after curing. For this reason, it is necessary to continuously perform processes from application to one base material to attachment to the other base material.

On the other hand, a hot melt adhesive is an adhesive that melts a solid adhesive by heat and bonds base materials to each other (for example, see Patent Documents 1 and 2). Although there is an advantage that it can be melted at about 100° C. and used easily, there is a disadvantage that the durability (heat resistance, bending resistance, cold resistance, hydrolysis resistance, etc.) is low because of its composition and molecular weight. In addition, it is sometimes necessary to use a dedicated melter, and thin film coating or gravure coating (dot adhesion or the like) is difficult and the degree of freedom in processing is low.

In addition, as an adhesive used for decorating apparel, bags, and shoes, an adhesive whose composition and molecular weight are adjusted so as to satisfy the above durability is used. However, a hot melt resin dissolved in an organic solvent has been used because of its high viscosity and extremely low processing suitability, but solvent-less is recommended due to recent environmental regulations.

CITATION LIST

Patent Document

Patent Document 1: JP 2000-336142 A
Patent Document 2: JP 2005-126595 A

SUMMARY OF INVENTION

Technical Problem

As described above, the moisture-curable adhesive does not exhibit adhesiveness after curing, and the hot melt adhesive has a low degree of freedom in processing. Therefore, if there is an adhesive which is moisture curing and can be subjected to thermocompression bonding such as a hot melt adhesive after curing thereof, not only excellent physical properties can be obtained but also the degree of freedom in processing can be enhanced, which is very significant, but such an adhesive is not practically known.

Accordingly, an object of the present invention is to provide a urethane prepolymer capable of thermocompression bonding after moisture curing and having a viscosity range that allows for a high degree of freedom in processing.

Solution to Problem

As a result of intensive studies to solve the above problems, the present inventors have found that when the viscosity at 100° C. is within a predetermined range and the thermal softening temperature after moisture curing is within a predetermined range, hot melting can be further performed after moisture curing, and a urethane prepolymer having a high degree of freedom in processing can be obtained, and have arrived at the present invention. That is, the present invention is as follows.

[1] A urethane prepolymer having an isocyanate group, a viscosity at 100° C. of 30 to 600 dPa·s, and a thermal softening temperature after moisture curing of 75 to 155° C.

[2] The urethane prepolymer according to item [1], wherein 10 to 55% of the total number of moles of the isocyanate group is sealed with a sealant.

[3] The urethane prepolymer according to items [1] or [2], wherein the urethane prepolymer is a reaction product of a polyisocyanate and a polyol, and an equivalent ratio (NCO/OH) of an isocyanate group of the polyisocyanate to a hydroxy group of the polyol is 1.2 to 2.5.

[4] An adhesive containing the urethane prepolymer according to any one of items [1] to [3].

[5] A laminate comprising a base film and a layer of moisture-cured product of a coating film containing the adhesive according to item [4] on the base film.

[6] A synthetic leather comprising a thermocompression-bonded product of a base fabric and the layer of moisture-cured product of the laminate according to item [5].

Advantageous Effects of Invention

According to the present invention, it is possible to provide a urethane prepolymer capable of thermocompression bonding after moisture curing and having a viscosity range that allows for a high degree of freedom in processing.

DESCRIPTION OF EMBODIMENTS

Figure 1:
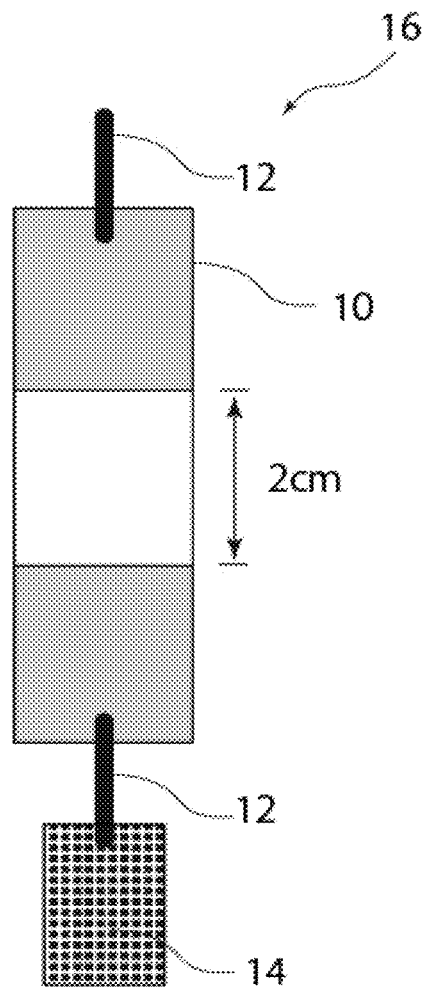
FIG. 1 is a schematic explanatory view illustrating a form of a sample used in evaluation of Examples.

Hereinafter, an embodiment of the present invention (present embodiment) will be described in detail, but the present invention is not limited to the embodiment.

[1. Urethane Prepolymer]

The urethane prepolymer according to the present embodiment has an isocyanate group, a viscosity at 100° C. of 30 to 600 dPa·s, and a thermal softening temperature after moisture curing of 75 to 155° C.

When the viscosity at 100° C. is less than 30 dPa, impregnation into the base fabric becomes significant, making processing difficult and the texture after moisture curing becomes hard. On the other hand, when the viscosity exceeds 600 dPa, the composition becomes viscous and processing becomes difficult. The viscosity is preferably 50 to 250 dPa, and more preferably 70 to 200 dPa.

In addition, when the thermal softening temperature after moisture curing is less than 75° C., in the case of producing a synthetic leather, it is easy to be impregnated into the base fabric, for example, resulting in a hard texture, so it is difficult to obtain good physical properties. When the temperature exceeds 155° C., the subsequent processing becomes difficult and the degree of freedom in processing is lowered. The thermal softening temperature is preferably 78 to 152° C., and more preferably 80 to 150° C.

The viscosity and the thermal softening temperature can be measured by the methods described in Examples.

In order to adjust the viscosity at 100° C. before moisture curing to the above range, it is preferable to adjust the type of polyol and the NCO/OH ratio, and in order to adjust the thermal softening temperature after moisture curing to the above range, for example, it is preferable to seal some isocyanate groups in the urethane prepolymer with a sealant. By sealing, the amount of the isocyanate group can be controlled, the softening point can be lowered, and the physical properties can be maintained. By being sealed with a sealant, for example, unlike blocked isocyanate in which a blocking agent is dissociated by heat, the sealant is less likely to be dissociated by heat, and thus the thermal softening temperature after moisture curing is easily controlled to 75 to 155° C. As a result, a urethane prepolymer capable of moisture curing and thermocompression bonding and having a high degree of freedom in processing can be obtained.

Examples of the sealant include lactams such as ε-caprolactam, δ-valerolactam, and γ-butyrolactam; aliphatic amines such as dimethylamine, diisopropylamine, di-n-propylamine, and diisobutylamine; alicyclic amines such as methylhexylamine and dicyclohexylamine; aromatic amines such as aniline and diphenylamine; aliphatic alcohols such as methanol, ethanol, 2-propanol, n-butanol, cetyl alcohol, isostearyl alcohol, oleyl alcohol, behenyl alcohol, lauryl alcohol, lanolin alcohol, hydrogenated lanolin alcohol, and 1-hexadecanol; phenols such as phenol, cresol, ethylphenol, n-propylphenol, isopropylphenol, n-butylphenol, octylphenol, nonylphenol, xylenol, diisopropylphenol, and di-t-butylphenol; imidazoles such as imidazole and 2-methylimidazole; pyrazoles such as pyrazole, 3-methylpyrazole, and 3,5-dimethylpyrazole; ethyleneimine; active methylenes such as dimethyl malonate, diethyl malonate, diisopropyl malonate, acetylacetone, methyl acetoacetate, and ethyl acetoacetate; and oximes such as acetone oxime, methyl ethyl ketoxime, and cyclohexanone oxime.

Among these, from the viewpoint of reactivity, control of synthesis, and the like, aliphatic alcohols are preferable, and aliphatic alcohols having 10 or more carbon atoms are more preferable.

From the viewpoint of adjusting the thermal softening temperature after moisture curing to a desired range, 5 to 60% of the total number of moles of the isocyanate group is preferably sealed with a sealant, and 10 to 55% is more preferably sealed. In order to obtain the above sealing ratio, the sealant may be blended so as to obtain a desired sealing ratio in consideration of the number of moles of active hydrogen of the sealant with respect to the total number of moles of the isocyanate group.

The urethane prepolymer before sealing according to the present embodiment is a reaction product of a polyisocyanate, a polyol, and if necessary, a chain extender such as a short chain diol or a short chain diamine, and an equivalent ratio (NCO/OH) of an isocyanate group of the polyisocyanate to a hydroxy group of the polyol is preferably 1.2 to 2.5. When the equivalent ratio (NCO/OH) is 1.2 to 2.5, processability can be ensured, and a synthetic leather having good texture can be obtained. The equivalent ratio is more preferably 1.5 to 2.2.

Hereinafter, the polyisocyanate, the polyol, and other components according to the present embodiment will be described.

(Polyol)

The polyol preferably has a number average molecular weight of 700 to 6000, more preferably 1000 to 4000, and examples thereof include the following.

(1) Polycarbonate Diol

Examples of the polycarbonate polyol include polytetramethylene carbonate diol, polypentamethylene carbonate diol, polyneopentyl carbonate diol, polyhexamethylene carbonate diol, and poly(1,4-cyclohexanedimethylene carbonate) diol, and random/block copolymers thereof.

(2) Polyether Polyol

Examples of the polyether polyol include those obtained by polymerizing or copolymerizing any of alkylene oxides (ethylene oxide, propylene oxide, butylene oxide, and the like) and heterocyclic ethers (tetrahydrofuran and the like). Specific examples thereof include polyethylene glycol, polypropylene glycol, polyethylene glycol-polytetramethylene glycol (block or random), polytetramethylene ether glycol, and polyhexamethylene glycol.

(3) Polyester Polyol

Examples of the polyester polyol include those obtained by polycondensing at least one of aliphatic dicarboxylic acids (for example, succinic acid, adipic acid, sebacic acid, glutaric acid, and azelaic acid) and aromatic dicarboxylic acids (for example, isophthalic acid and terephthalic acid) with low molecular weight glycols (for example, ethylene glycol, 1,2-propylene glycol, 1,3-propylene glycol, 1,3-butylene glycol, 1,4-butylene glycol, 1,6-hexamethylene glycol, neopentyl glycol, and 1,4-bishydroxymethylcyclohexane).

Specific examples thereof include polyethylene adipate diol, polybutylene adipate diol, polyhexamethylene adipate diol, polyneopentyl adipate diol, polyethylene/butylene adipate diol, polyneopentyl/hexyl adipate diol, poly-3-methylpentane adipate diol, and polybutylene isophthalate diol.

(4) Polylactone Polyol

Examples of the polylactone polyol include polycaprolactone diol and poly-3-methylvalerolactone diol.

(5) Polyolefin Polyol

Examples of the polyolefin polyol include polybutadiene glycol and polyisoprene glycol, and hydrides thereof.

(6) Polymethacrylate Diol

Examples of the polymethacrylate diol include α,ω-polymethyl methacrylate diol and α,ω-polybutyl methacrylate diol.

(7) Polysiloxane Polyol

Dimethylpolysiloxane is preferred as the polysiloxane polyol. Since lubricity can be imparted, it is particularly useful when used as a coating agent.

These polyols may be used alone or in combination of two or more thereof, but from the viewpoint of long-term durability, it is preferable to contain a polycarbonate diol.

The number average molecular weight is a number average molecular weight in terms of polystyrene, and can be usually determined by measurement of gel permeation chromatography (GPC).

(Polyisocyanate)

Examples of the polyisocyanate compound include aromatic diisocyanates such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 4,4'-methylenebis(phenylene isocyanate) (MDI), durylene diisocyanate, tolylene diisocyanate, xylylene diisocyanate (XDI), 1,5-naphthalene diisocyanate, benzidine diisocyanate, o-nitrobenzidine diisocyanate, and 4,4'-diisocyanate dibenzyl; aliphatic diisocyanates such as methylene diisocyanate, 1,4-tetramethylene diisocyanate, 1,6-hexamethylene diisocyanate, and 1,10-decamethylene diisocyanate; alicyclic diisocyanates such as 1,4-cyclohexylene diisocyanate, 4,4'-methylenebis(cyclohexyl isocyanate), 1,5-tetrahydronaphthalene diisocyanate, isophorone diisocyanate, hydrogenated MDI, and hydrogenated XDI; and polyurethane prepolymers obtained by reacting these diisocyanate compounds with low-molecular weight polyols or polyamines such that the terminals become isocyanate.

(Chain Extender)

(1) Short Chain Diol

The short chain diol is a compound having a number average molecular weight of less than 500, and includes aliphatic glycols such as ethylene glycol, 1,2-propylene glycol, 1,3-propylene glycol, 1,3-butylene glycol, 1,4-butylene glycol, 1,6-hexamethylene glycol, and neopentyl glycol, and alkylene oxide low molar adducts thereof (number average molecular weight of less than 500); alicyclic glycols such as 1,4-bishydroxymethylcyclohexane and 2-methyl-1,1-cyclohexanedimethanol, and alkylene oxide low molar adducts thereof (number average molecular weight of less than 500); aromatic glycols such as xylylene glycol, and alkylene oxide low molar adducts thereof (number average molecular weight of less than 500); bisphenols such as bisphenol A, thiobisphenol, and sulfonebisphenol, and alkylene oxide low molar adducts thereof (number average molecular weight of less than 500); and alkyldialkanolamines such as C1 to C18 alkyldiethanolamine. In addition, a diol containing anionic group such as a carboxy group, a sulfo group, a phosphoric acid group, or an amino group can be used.

(2) Short Chain Diamine

Examples of the short chain diamine include aliphatic diamine compounds such as ethylenediamine, trimethylenediamine, hexamethylenediamine, and octamethylenediamine; aromatic diamine compounds such as phenylenediamine, 3,3'-dichloro-4,4'-diaminodiphenylmethane, 4,4'-methylenebis(phenylamine), 4,4'-diaminodiphenylether, and 4,4'-diaminodiphenylsulfone; alicyclic diamine compounds such as cyclopentanediamine, cyclohexyldiamine, 4,4-diaminodicyclohexylmethane, 1,4-diaminocyclohexane, and isophoronediamine; and hydrazines such as hydrazine, carbodihydrazide, adipic acid dihydrazide, sebacic acid dihydrazide, and phthalic acid dihydrazide.

The above compounds are examples of preferred components, and the present invention is not limited thereto. Accordingly, not only the components exemplified above but also other compounds which are currently commercially available and easily available from the market can be used.

In addition, an epoxy resin, polyvinyl chloride, or the like may be used in combination with the urethane prepolymer within a range that does not affect the effects of the present invention.

(Method for Producing Urethane Prepolymer)

The urethane prepolymer according to the present embodiment can be produced by, for example, reacting a polyol, a polyisocyanate, and if necessary, a chain extender such as a short chain diol or a short chain diamine at an equivalent ratio (NCO/OH) of an isocyanate group to an active hydrogen-containing group (e.g., a hydroxy group) of 1.2 to 2.5 by a one-shot method or a multistage method at 20 to 150° C. (preferably 60 to 110° C.) until the product reaches the theoretical NCO %, and further mixing and reacting a predetermined amount of a sealant.

In the above production method, a catalyst can be used if necessary. Examples of the catalyst include salts of metals and organic or inorganic acids such as dibutyltin laurate, dioctyltin laurate, stannous octoate, lead octylate, and tetra-n-butyl titanate; organometallic derivatives; organic amines such as triethylamine; and diazabicycloundecene-based catalysts.

The urethane prepolymer is preferably reacted in a solvent-free condition without using an organic solvent. Thus, a solventless urethane prepolymer can be obtained.

If necessary, an additive may be added to the urethane prepolymer. Examples of the additive include an antioxidant (e.g., hindered phenol-based, phosphite-based, or thioether-based), a light stabilizer (e.g., hindered amine-based), an ultraviolet absorber (e.g., benzophenone-based or benzotriazole-based), a gas discoloration stabilizer (e.g., hydrazine-based), a metal deactivator, and two or more thereof.

The urethane prepolymer according to the present embodiment as described above is particularly suitable for applications such as an adhesive, a laminate, a coating agent, and a synthetic leather.

[2. Adhesive]

The adhesive of the present embodiment contains the urethane prepolymer of the present invention. In the adhesive of the present embodiment, an appropriate amount of a thermoplastic polymer, a tackifier resin, a catalyst, a pigment, an antioxidant, an ultraviolet absorber, a surfactant, a flame retardant, a filler, a foaming agent, or the like may be blended as necessary, but the adhesive is preferably composed of a polyurethane prepolymer. In addition, the adhesive of the present embodiment is preferably for synthetic leather, that is, an adhesive for synthetic leather.

By applying the adhesive of the present embodiment to the surfaces of adherends, the adherends can be easily bonded to each other. Examples of the adherend include metal or non-metal (polycarbonate, glass, etc.) base materials other than the above-described base material for synthetic leather.

[3. Laminate]

The laminate of the present invention has a moisture-cured product layer of a coating film containing the adhesive of the present invention on a base film.

Examples of the base film include, in addition to the base film for synthetic leather, an optical film, an optical plate, a flexible printed circuit board, a glass substrate, and a substrate obtained by depositing ITO on these substrates.

The laminate of the present invention can be obtained by applying the adhesive of the present invention onto the base film by a known method such as comma coating, knife coating, or roll coating, and moisture curing the adhesive coating film to form a moisture-cured product layer.

[4. Synthetic Leather]

The synthetic leather of the present invention has a thermocompression-bonded product of a base fabric and the moisture-cured product layer of the laminate of the present invention.

Examples of the base fabric include a woven fabric formed by twill weaving, plain weaving, or the like, a raised fabric obtained by mechanically raising a cotton fabric of the woven fabric, a rayon fabric, a nylon fabric, a polyester fabric, a Kevlar fabric, a nonwoven fabric (polyester, nylon, various latexes), various films, and sheets.

The synthetic leather can be produced, for example, as follows. A base fabric is laminated on the moisture-cured product layer of the laminate of the present invention and press-bonded at 75 to 155° C. Further, aging or the like is carried out as necessary to obtain the synthetic leather of the present invention.

The synthetic leather as described above is suitable for shoes, clothing, bags, furniture, vehicle interior materials (for example, instrument panels, doors, consoles, seats), and the like.

EXAMPLES

Next, the present invention will be described in more detail with reference to Examples and Comparative Examples, but the present invention is not limited to Examples and the like. The number average molecular weight was measured by GPC, in terms of polystyrene.

Example 1

A 500 mL glass reaction vessel equipped with a stirrer, a thermometer, a gas inlet, and the like was charged with 100 parts by mass of a polyester polyol composed of adipic acid and 1,4-butanediol and having a number average molecular weight of 2000, and 25 parts by mass of 4,4'-diphenylmethane diisocyanate (MDI), subjected to a dehydration treatment by heating and reducing the pressure, and then nitrogen gas was sealed and the mixture was stirred and reacted at an internal temperature of 100° C. for 120 minutes. Here, NCO/OH was set to 2.0. Thereafter, 2.4 parts by mass of 1-hexadecanol as a sealant was reacted to obtain a urethane prepolymer.

Examples 2 to 5 and Comparative Examples 1 and 2

A urethane prepolymer was obtained in the same manner as in Example 1 except that the blending proportion was as shown in Table 1.

The urethane prepolymer prepared in each example and comparative example was measured for viscosity, thermal softening temperature, and adhesion strength as described below.

(Viscosity Measurement)

The viscosity of each urethane prepolymer was measured using a BM type viscometer (Tokyo Keiki Inc.) under the conditions of rotor No. 4, 30 rpm, and 100° C.

(Measurement of Thermal Softening Temperature)

(1) Preparation of Sample

A urethane prepolymer heated to 100° C. was coated on a release paper so as to have a film thickness of 50 μm, aged at the conditions of 25° C. and 60 RH % for 48 hours or more, and then peeled off from the release paper to obtain a translucent film having a width of 1.5 cm and a length of 6 cm. As shown in FIG. 1, a sample 16 was prepared by attaching clips 12 to the upper and lower sides of a translucent film 10, further fixing the clips 12 with Cellotape (registered trademark), and attaching a weight 14 to one of the clips 12 so as to apply a load of 450 g/cm$^2$ when the sample was suspended. Note that 2 cm in the longitudinal direction of the central portion of the film 10 is not covered with Cellotape (registered trademark).

(2) Measurement

Figure 2:
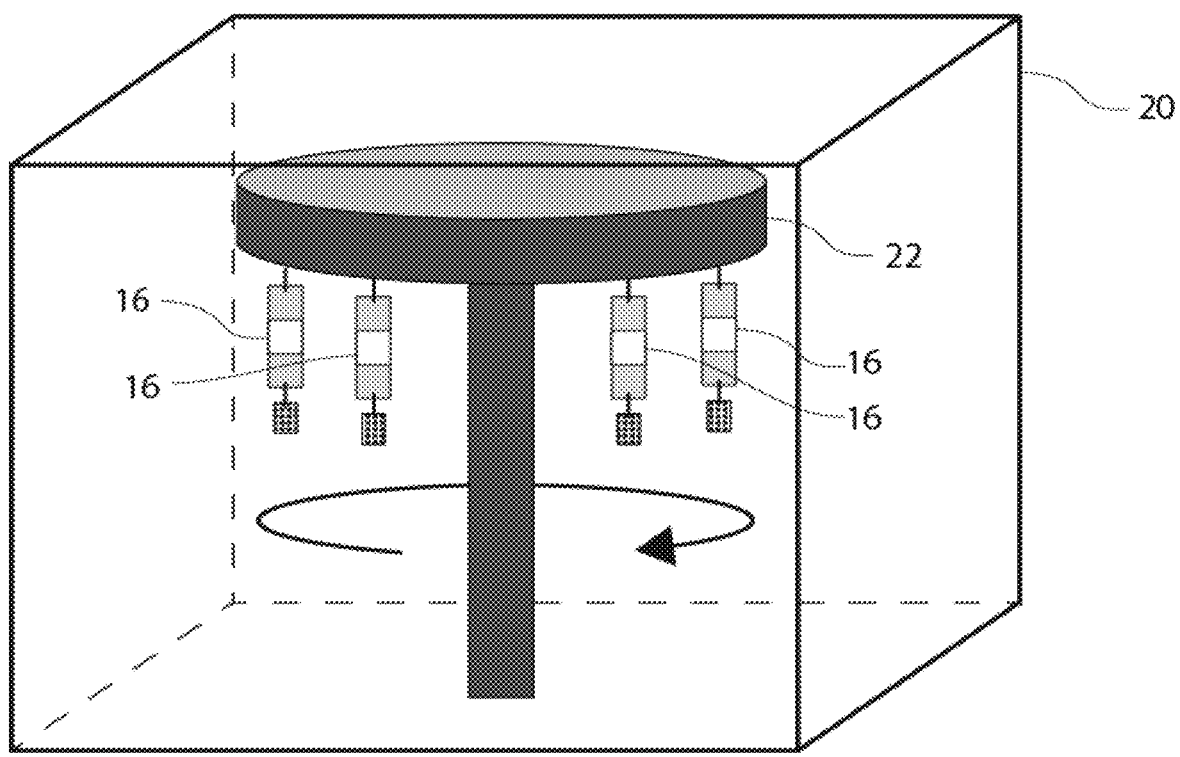
FIG. 2 is an explanatory view illustrating a form of a gear oven used in the evaluation of Examples.

As shown in FIG. 2, the clip 12 of the sample 16 of each example without the weight 14 attached thereto was attached to a rotary board 22 of a gear oven 20. Thereafter, the inside of the gear oven 20 was heated from room temperature at a rate of 3° C./min while rotating the rotary board 22 at 5 rpm. A temperature at which the film 10 was cut or stretched twice was recorded as a softening point.

(Adhesion Strength)

(1) Film Preparation

A urethane prepolymer heated to 100° C. was coated on a release paper so as to have a film thickness of 50 μm, aged at the conditions of 25° C. and 60 RH % for 48 hours or more, and then peeled off from the release paper to obtain a translucent film.

(2) Laminate

Using a base fabric of a polyester mesh material for testing, the film obtained above was sandwiched between the base fabrics from above and below and thermocompression bonded from above at 150° C. for 5 seconds, and then a strip-shaped measurement sample having a 20 mm width was prepared.

(3) Measurement

The adhesion strength was measured by pulling the sample at a rate of 200 mm/min using an autograph AGS-J (manufactured by Shimadzu Corporation). When the adhesion strength was 0.3 kgf/cm or more, it was determined that the adhesion exceeded a level at which there was no practical problem in using the base material.

TABLE 1

| Raw material | Example 1 | Example 2 | Example 3 | Example 4 | Example 5 | Comparative Example 1 | Comparative Example 2 |
|---|---|---|---|---|---|---|---|
| Polyester polyol | 100 | 100 | 100 | 100 | 100 | 100 | 100 |
| MDI | 25 | 25 | 25 | 25 | 25 | 25 | 25 |
| NCO/OH ratio | 2.0 | 2.0 | 2.0 | 2.0 | 2.0 | 2.0 | 2.0 |
| 1-Hexadecanol | 2.4 | 4.8 | 6.1 | — | — | 1.2 | 7.3 |
| 1-Dodecanol | | | | 2.8 | — | | |
| Dibutylamine | | | | | 1.9 | | |
| Sealing ratio (mol %) | 20 | 40 | 50 | 30 | 30 | 10 | 60 |
| Viscosity (dPa · S) | 90 | 120 | 130 | 110 | 80 | 85 | 155 |

TABLE 1-continued

| Raw material | Example 1 | Example 2 | Example 3 | Example 4 | Example 5 | Comparative Example 1 | Comparative Example 2 |
|---|---|---|---|---|---|---|---|
| Thermal softening point (° C.) | 150 | 115 | 80 | 130 | 125 | 165 | 60 |
| Adhesion strength (kgf/cm) | 0.3 | 0.7 | 0.5 | 0.4 | 0.6 | 0.1 | 0.1 |

(Preparation of Synthetic Leather)

Resamine NE-8875-30M (manufactured by Dainichiseika Color & Chemicals Mfg. Co., Ltd.) was coated on a release paper so as to have a film thickness of 40 μm and dried at 120° C. for 5 minutes to obtain a skin layer.

On the other hand, the moisture-curable adhesive shown in Example 1 was coated onto a release paper so as to have a film thickness of 100 μm, and aged at the conditions of 25° C. and 60 RH % for 48 hours to obtain an adhesive layer.

The obtained adhesive layer was peeled off from the release paper, sandwiched between the skin layer and the base fabric of the polyester mesh material for testing, and laminated under the conditions of 170° C., 0.15 MPa, and 30 seconds using a sealer having a heat source on the release paper side of the skin layer. Finally, the release paper of the skin layer was peeled off to obtain a synthetic leather. The synthetic leather thus obtained had good texture.

REFERENCE SIGNS LIST

10 Film
12 Clip
14 Weight
16 Sample
20 Gear oven
22 Rotary board

The invention claimed is:

1. An adhesive, consisting of a urethane prepolymer having an isocyanate group,
    a viscosity at 100° C. of 30 to 600 dPa's before moisture curing, and
    a thermal softening temperature after moisture curing of 75 to 155° C.,
    wherein 10 to 55% of the total number of moles of the isocyanate group is sealed with a sealant,
    wherein the sealant is at least one selected from the group consisting of aliphatic alcohols having 10 or more carbon atoms, aliphatic amines, alicyclic amines, aromatic amines, pyrazoles, and imidazoles,
    wherein the urethane prepolymer is a reaction product of a polyol and a polyisocyanate, wherein the polyol is one polyol or a combination of two polyols, and
    wherein the polyisocyanate is not 1,6-hexamethylene diisocyanate.

2. An adhesive, consisting of a urethane prepolymer having an isocyanate group,
    a viscosity at 100° C. of 30 to 600 dPa's before moisture curing, and
    a thermal softening temperature after moisture curing of 75 to 155° C.,
    wherein 10 to 55% of the total number of moles of the isocyanate group is sealed with a sealant,
    wherein the sealant is at least one selected from the group consisting of aliphatic alcohols having 10 or more carbon atoms, aliphatic amines, alicyclic amines, aromatic amines, pyrazoles, and imidazoles,
    wherein the urethane prepolymer is a reaction product of a polyol and a polyisocyanate, wherein the polyol is one polyol or a combination of two polyols,
    wherein the polyisocyanate is not 1,6-hexamethylene diisocyanate, and
    wherein an adhesion strength after thermocompression bonding of a film obtained after moisture curing is 0.3 kgf/cm or more.

3. The adhesive according to claim 1, wherein the polyol is selected from the group consisting of a polycarbonate polyol, a polyether polyol, and a polyester polyol.

4. The adhesive according to claim 2, wherein the polyol is selected from the group consisting of a polycarbonate polyol, a polyether polyol, and a polyester polyol.

5. The adhesive according to claim 1, wherein the sealant is at least one selected from the group consisting of aliphatic alcohols having 10 or more carbon atoms.

6. The adhesive according to claim 1, wherein the sealant is at least one selected from the group consisting of aliphatic amines.

7. The adhesive according to claim 1, wherein the sealant is at least one selected from the group consisting of alicyclic amines.

8. The adhesive according to claim 1, wherein the sealant is at least one selected from the group consisting of aromatic amines.

9. The adhesive according to claim 1, wherein the sealant is at least one selected from the group consisting of pyrazoles.

10. The adhesive according to claim 1, wherein the sealant is at least one selected from the group consisting of imidazoles.

11. The adhesive according to claim 1, wherein the urethane prepolymer is a reaction product of a polyol and a polyisocyanate, wherein the polyol is one polyol.

12. The adhesive according to claim 1, wherein the urethane prepolymer is a reaction product of a polyol and a polyisocyanate, wherein the polyol is a combination of two polyols.

13. The adhesive according to claim 1, wherein the polyol is a polycarbonate polyol.

14. The adhesive according to claim 1, wherein the polyol is a polyether polyol.

15. The adhesive according to claim 1, wherein the polyol is a polyester polyol.

16. The adhesive according to claim 2, wherein the sealant is at least one selected from the group consisting of aliphatic alcohols having 10 or more carbon atoms.

17. The adhesive according to claim 2, wherein the sealant is at least one selected from the group consisting of aliphatic amines.

18. The adhesive according to claim 2, wherein the sealant is at least one selected from the group consisting of alicyclic amines.

19. The adhesive according to claim 2, wherein the sealant is at least one selected from the group consisting of aromatic amines.

20. The adhesive according to claim 2, wherein the sealant is at least one selected from the group consisting of pyrazoles.

\* \* \* \* \*